INVENTORS
GIUSEPPE SPEGGIORIN
BY ALFEO LAMPUZZI
*Bacon & Thomas*
ATTORNEYS

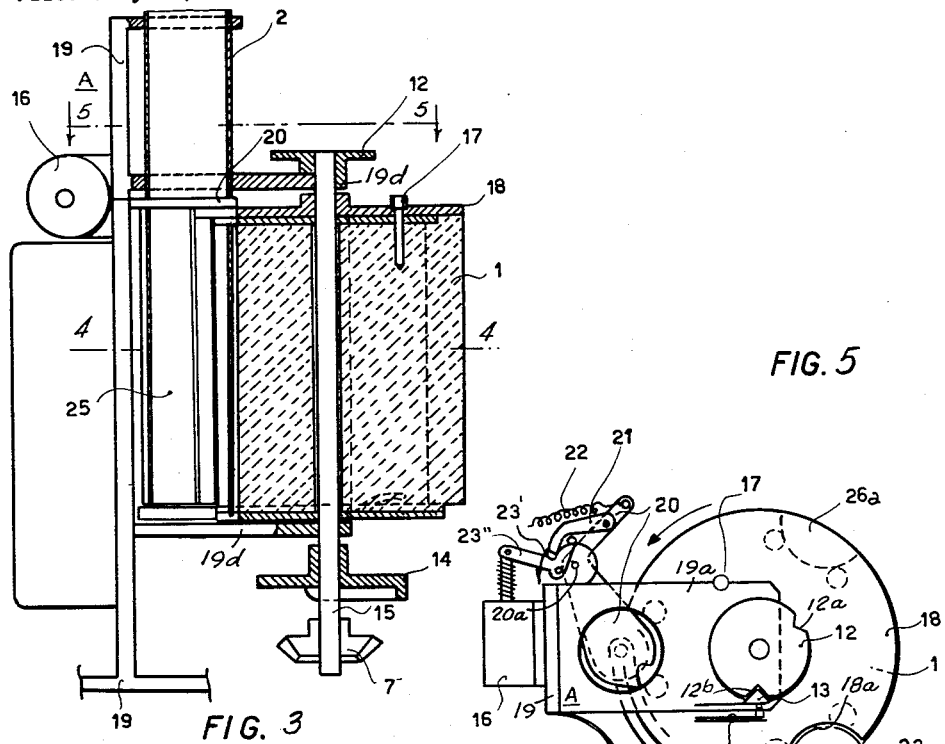
FIG. 3
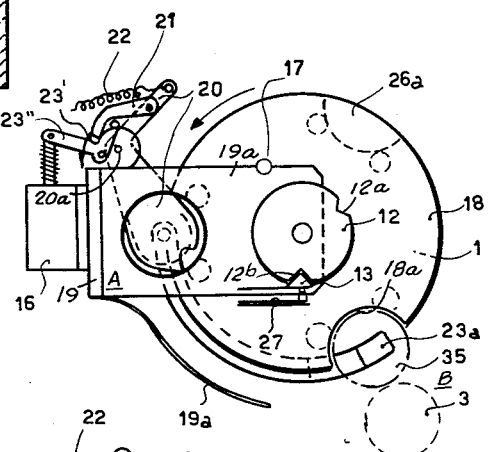
FIG. 5
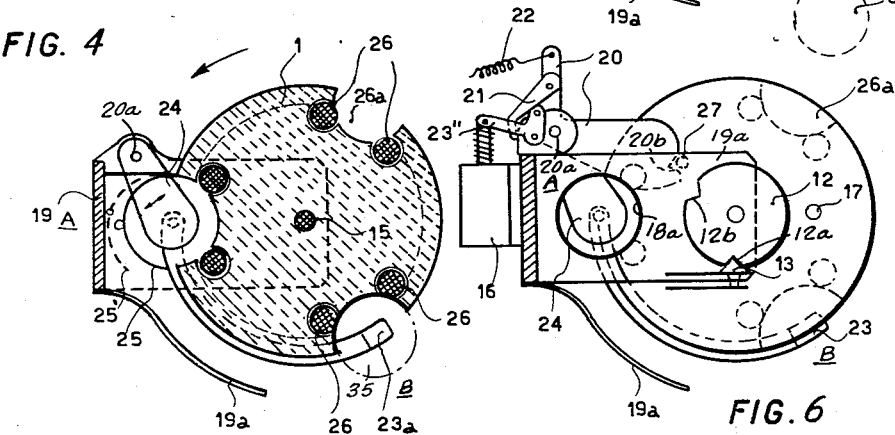
FIG. 4
FIG. 6
INVENTORS
GIUSEPPE SPEGGIORIN
BY ALFEO LAMPUZZI
Bacon & Thomas
ATTORNEYS

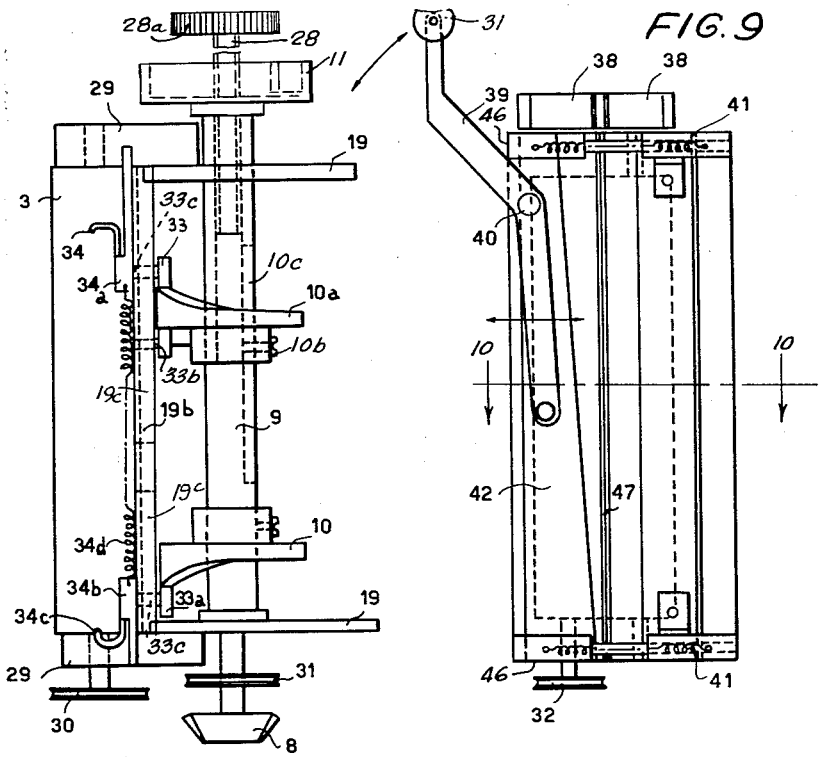

United States Patent Office 3,000,160
Patented Sept. 19, 1961

3,000,160
UNIVERSAL WINDING MACHINE FOR COINS
AND DISC SHAPED OBJECTS
Giuseppe Speggiorin and Alfeo Lampuzzi, both of
Via Dogana 1, Milan Italy
Filed July 20, 1959, Ser. No. 828,127
Claims priority, application Italy July 23, 1958
10 Claims. (Cl. 53—212)

This invention relates to a wrapping apparatus, and more specifically to an apparatus for automatically stacking a predetermined number of metal coins or disc shaped objects and wrapping them by a paper band.

It is an object of the invention to provide a novel apparatus which automatically stacks a predetermined number of metal coins or similar objects at one station, and moves the stack to another station where the stack is wrapped.

It is a further object to provide a novel apparatus of the type described capable of handling a large variety of coins having different diameters and thicknesses.

It is a still further object to provide a novel apparatus of the type that is simple and rugged in construction, and is fully automatic.

With the following and other objects in view which will appear in the following description, the invention resides in the novel combination and arrangement of parts, and/or the details of construction hereinafter claimed, and illustrated in the accompanying drawings, in which:

FIG. 3 is a vertical sectional view through the indexing mechanism on the line 3—3 of FIG. 1;

FIG. 4 is a horizontal sectional view through the indexing mechanism on the line 4—4 of FIG. 3;

FIG. 5 is a plan view of the indexing mechanism on the line 5—5 of FIG. 3, showing the parts in one position;

FIG. 6 is a plan view similar to that of FIG. 5 showing the parts rotated 240° counterclockwise from the position of FIG. 5;

FIG. 7 is an elevation view of the winding and beading mechanism;

FIG. 8 is a plan view of the winding and beading mechanism;

FIG. 9 is an elevation view of the wrapper feeding and cutting mechanism; and

FIG. 10 is a transverse sectional view along the line 10—10 of FIG. 9.

Figure 1:
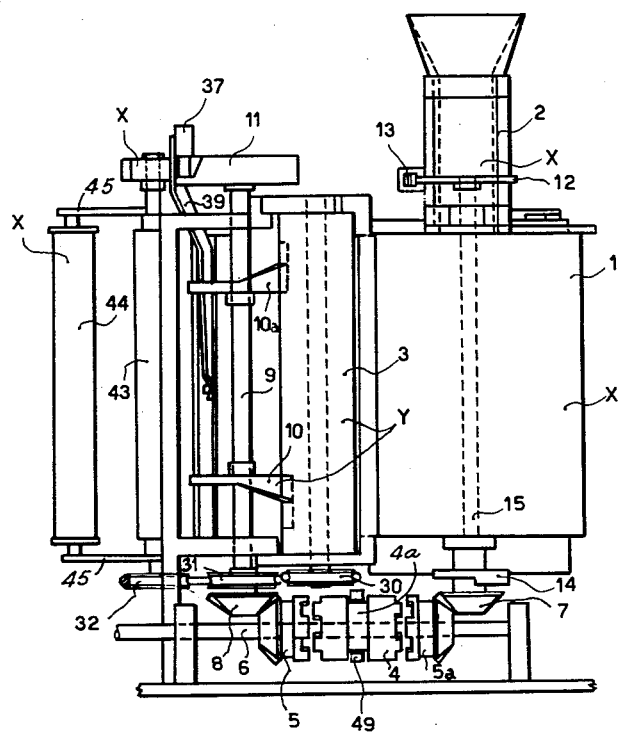
FIG. 1 is an elevation view of a preferred form of the apparatus according to the invention.

The apparatus comprises the following three cooperating parts: (1) stacking and indexing mechanism X; (2) stack wrapping and beading mechanism Y; and (3) wrapper feeding and cutting mechanism Z. The mechanisms X, Y and Z are supported, in cooperative relation, on a common frame structure 19.

*Stacking and indexing mechanism X*

The details of the stacking and indexing mechanism are shown in FIGS. 1 to 6, and the mechanism comprises a vertically disposed shaft 15 mounted for rotation in bearings carried by a pair of parallel arms 19d extending from the frame structure 19. A conveyor, comprising a drum 1, is rotatably mounted on the shaft 15 between the upper and lower arms 19d. A series of axially extending recesses 26a is provided in the periphery of the drum, each recess being arcuate in cross section and each having a different diameter to accommodate coins of different diameters. In the embodiment illustrated, three recesses 26a, spaced 120° apart circumferentially, are shown, but it should be understood that a greater number or a lesser number may be provided. Smaller axially extending recesses are formed in the walls of the recesses 26a to receive rollers 26, the periphery of which is arranged to extend into the recess 26a for a purpose to be set forth hereinafter.

A disk 18 is disposed between the drum 1 and the upper arm 19d, being connected with the shaft 15 for rotation therewith. The disk 18 has a diameter substantially the same as that of the drum 1, and has a peripheral recess 18a of arcuate section, the diameter of which is equal to the diameter of the largest recess 26a in the drum.

The drum 1 may be rotatably adjusted relative to the disc 18 to align any particular recess 26a in the drum with the recess 18a in the disc, and the disc and drum may then be locked in such position by a pin 17 adapted to register with a hole in the disc 18 and with one of three holes in drum 1. When so locked, rotation of the disc 18 produces a concurrent rotation of drum 1.

The apparatus includes a coin feeding station A and a coin wrapping station B, both of which are located adjacent the periphery of the drum 1, and angularly displaced approximately 120° apart, as shown in FIGS. 4, 5 and 6.

A vertically disposed coin feeding tube 2 is supported by the frame structure 19 at the coin feeding station A, said tube having a funnel shaped upper end to facilitate the loading with coins, the lower end of the tube disposed adjacent the periphery of the disc 18, and adapted to register with the opening 18a therein, as shown in FIGS. 3 and 4. A stop means 20 is positioned adjacent the bottom of the tube 2 to control the delivery of coins from the tube into a selected one of the recess 26a in the drum 1. The stop member 20 is in the form of an L-shaped bell crank lever, and is pivoted for rotary motion about a pivot 20a for movement from an operative position in which the wider end is in registry with the tube 2 (FIG. 5) into an inoperative position (FIG. 6) in which the larger end is swung counterclockwise clear of the tube. A spring 22 is connected to one end of the stop member 20 to urge it in a counterclockwise direction. A latch 21 is pivotally mounted on the outer arm of the member 20, and is adapted to engage a notch 23′ (FIG. 5) to retain the member 20 in its operative position. A latch trip member 23″ is pivotally supported adjacent the latch 21 in a position in which one arm of the trip member can engage and trip the latch when energized by a solenoid 16 connected to the other arm thereof. The stop member 20 includes a notch 20b in one end adapted to lie, when in its inoperative position, in the path of travel of a pin 27 carried by the disc 18, which pin is effective to engage and rotate the stop member clockwise from the inoperative position shown in FIG. 6 to the operative position shown in FIG. 5, as will be described more fully hereinafter.

An elongated arcuate plate 25 (FIGS. 3 and 4) is resiliently mounted in alignment with and below the tube 2, and is adapted to register with the selected one of the recesses 26a when in the coin filling position, to form a closure for the recess and to assist in stacking the coins.

The plate 25 has a length equal to the axial length of the recess in the drum, and is resiliently urged toward the periphery of the drum as shown in solid lines, but, because of its resilient support, the plate 25 can flex outwardly to the position shown in broken lines 25' when the drum is rotated.

An arcuate plate 19a, having an axial length equal to the axial length of the drum 1, and mounted concentrically thereof in the frame 19 (FIGS. 4, 5 and 6) and resiliently urged toward the drum, is adapted to contact the edges of a stack 35 of coins in the recesses 26a when the drum is rotated counterclockwise, as indicated by the arrow in FIG. 4, from the feeding station A to the wrapping station B, for the purpose of retaining the coins in the recess and to properly stack them if this has not previously been performed. If desired, the plate 19a can be extended to the position occupied by the arcuate plate 25, to perform the additional function of the latter, whereby the arcuate plate 25 may be omitted. A stop member 24 is pivotally mounted below the drum 1 on the same pivotal member 20a, and is adapted to move from an operative position in alignment with the bottom of the recess 26a (FIGS. 4 and 6), to an inoperative position out of registry therewith. The stop member 24 is connected for concurrent movement with the stop member 20, as will be described hereinafter. An arcuate sliding member 23a is disposed in the plane of the stop member 24, and positioned immediately below the drum 1, to retain the stacked coins within the recess 26a while being moved from the feeding station A to the wrapping station B.

The lower end of the shaft 15 carries a bevel gear 7 (FIG. 1), which cooperates with a bevel gear 5a rotatably mounted on a transverse shaft 6, to be intermittently driven by a jaw clutch member 4 connected to the shaft for rotation therewith and axially slidable thereon. The bevel gear 5a includes clutch members adapted to interengage the teeth on the clutch member 4 when the latter is moved toward the right from the neutral position shown in FIG. 1. The lower end of the shaft 15, between the bevel gear 7 and the bottom of the drum 1, carries a cam 14 for a purpose to be explained hereinafter, and the upper end of the shaft 15 carries a cam 12 having a pair of recesses 12a and 12b, spaced 120° apart, to cooperate with a movable contact 13 of a switch.

Figure 2:
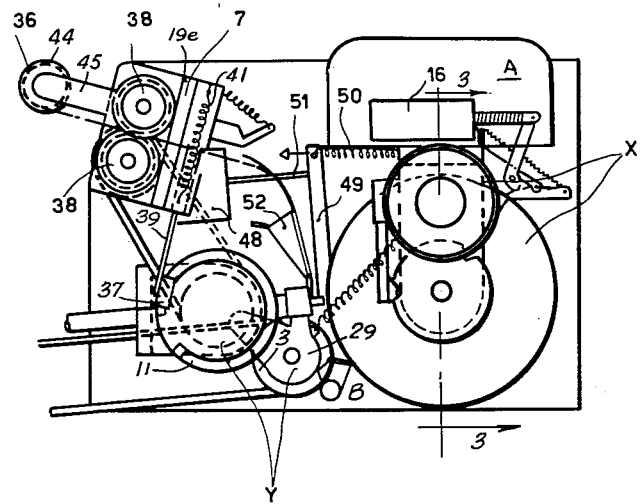
FIG. 2 is a plan view.

A vertical shaft 9 (FIGS. 1 and 7) is mounted for rotation in the frame 19 and carries, at its lower end, a bevel gear 8 in engagement with a bevel gear 5 rotatably mounted on the shaft 6. The bevel gear 5 includes clutch teeth that are adapted to engage mating teeth on the slidable clutch element 4 when the latter is shifted toward the left from the neutral position shown in FIG. 1. The slidable clutch element 4 includes an annular recess 4a, which receives the forked end of a lever 49 pivoted for movement about a support intermediate its ends (FIG. 2). A spring 50 urges lever 49 to rotate in a clockwise direction, which tends to urge the clutch member 4 toward the left into engagement with the clutch portion of the bevel gear 5, which operation is restrained by a stop, not shown, under the control of the cam 14. A solenoid 48 is connected by a link 51, to the spring end of the lever 49, and, when energized, produces a counterclockwise rotation of the lever 49 about its pivotal support and a movement of the clutch element 4 toward the right into engagement with the teeth on the bevel gear 5a.

Stack wrapping and beading mechanism Y

The mechanism for wrapping a stack 35 of coins in one of the recesses 26a in the drum 1 and for forming a beading on the edges of the wrapper is designated by the letter Y, and is shown in FIGS. 1, 2, 5, 7 and 8. This mechanism includes the vertical shaft 9 previously described, which carries an upper cam 11 and two intermediate cams 10 and 10a connected to rotate with the shaft 9. As shown in FIG. 7, the cam 10a is supported for axial adjustment on the shaft 9 by a screw threaded member 28 having a knurled wheel 28a on the upper end thereof. Relative rotation between the cam 10a and the shaft 9 is prevented by a pin 10b engageable with a slot 10c in the shaft (FIG. 7). The frame 19 includes a vertically disposed support 19b (FIG. 7), which is arranged parrallel to the shaft 9 and is adapted to slidably support a pair of blocks 34a and 34b, said blocks being carried on the end of shafts 33c, slidably supported in slots 19c in the support 19b. The shaft 33c of block 34a carries a roller 33 which is adapted to cooperate with the cam surface on the upper end of the cam 10a, and similarly the shaft 33c of the block 34b carries a roller 33a adapted to cooperate with the cam surface on the lower end of cam 10. The rollers 33 and 33a are maintained in contact with the respective cam surfaces by a spring 34d, the ends of which are connected to the blocks 34a and 34b to urge them toward one another. An idler roller 33b, having a stem which passes through the slot 19c and connected to the spring 34d, engages the lower face of the cam 10a to provide stability. Blocks 34a and 34b include oppositely disposed beading hooks 34 and 34c, respectively, which are adapted to engage the edges of the wrapper to form a bead thereon, as described more fully hereafter.

With reference to FIGS. 7 and 8, it should be noted that the beading hooks 34 and 34c are disposed in the path of travel of a strip of wrapping material 36, and that the cams 10 and 10a are effective to periodically move them toward and away from the edges of the wrapping material. A vertically disposed cylinder 3 (FIGS. 5, 7 and 8) is rotatably mounted on a shaft supported by a pair of pivotally mounted arms 29, hinged on the support 19. The lower end of the shaft supporting the cylinder 3 carries a pulley 30 that is connected through a belt to a driving motor, not shown, for continuous rotation. Means, not shown, are intermittently actuated to swing the cylinder 3 into an operative position relative to a stack 35 of coins in one of the recesses 26a, in which position the cylinder 3 is effective to rotate the stack of coins and to also cause winding of the interposed strip of wrapping material 36, as shown in FIG. 8, and to be described in greater detail hereafter.

The shaft 9 includes a cam, not shown, that operates a switch to close the energizing circuit of the solenoid 48. Also a stop member, not shown, is positioned to be controlled by the lower block 34b, which controls the swinging movement of the cylinder 3 toward and away from the stack of the coins. The cam 11 controls the cutting operation of the mechanism Z, as will be described hereinafter.

Wrapper feeding and cutting mechanism Z

The wrapper feeding and cutting mechanism includes a pair of rollers 43 (FIGS. 9 and 10) between which an endless strip of wrapping material 36 is passed. The shaft of one of the rollers 43 is connected to a pulley 32 which is driven by a belt from the pulley 31 on shaft 9 (FIG. 1). The two rollers 43 have the same diameter and are driven at the same speed in opposite directions by a pair of interengaging gears 38 on the upper extremities of the roller shafts. And endless sheet of wrapping material 36 passes over an idler roller 44, suspended by a pair of arms 45 in spaced relation to one another, and the wrapping material feeding from the rollers passes through an adjacent cutting device comprising a pair of vertical cutting blades. One of the cutting blades 42a is fixed, whereas the other blade 42 is slidably supported in upper and lower guides 46 and reciprocated by a pivotally supported lever 39 engaging the mid-point of the cutting blade 42. The lever 39 is pivoted at 40, and the outer end carries a roller 37 adapted to ride on the surface of cam 11, as more clearly shown in FIG. 2. Upper and lower springs 41, having one end connected to the cutting blade 42, resiliently urge the cutting blade toward the stationary blade 42a. The rollers 43 are supported in a frame structure 19e, which includes a vertically extending slit 47, aligned with the cutting edge of the stationary cutting blade 42a, through which the wrapping material 36 is fed, as shown in FIG. 10. A funnel-shaped tube 52 (FIGS. 2 and 8) is provided between the wrapping material feeding and cutting mechanism Z and the wrapping station B to receive the wrapping material fed from the rollers 43 and to deliver them in proper position for wrapping between a stack 35 of coins and the cylinder 3. The rotation of the shaft 9 controls the time of feeding the wrapping material, and is timed so that the feeding operation begins when the wrapping operation begins.

*Operation*

After the drum 1 has been set for the particular coins to be stacked and wrapped, by adjustment of the drum 1 relative to the disc 18 and the locking thereof in this position by the pin 17, a number of coins to be wrapped is introduced into the tube 2 which, at this time, is closed at its lower end by the stop member 20, which is latched in this operative position as shown in FIG. 5. A hand operated or an automatic contact, which may be operated by a coin counter, closes an electrical circuit which is effective to energize the solenoid 16 to rotate the trip lever 23″ counterclockwise from the position shown in FIG. 5 to the position shown in FIG. 6. This operation trips the latch 21 by removing the end from the notch 23′, whereupon the spring 22 becomes effective to rotate the stop member 20 counterclockwise from its operative position aligned with the tube 2 to the inoperative position offset thereof, shown in FIG. 6. At the same time, the stop member 24 below the recess 26a is swung to its operative position (FIG. 6). The coins in the tube 2 drop by gravity into the recess 26a, wherein they form a stack held in the recess by the bottom stop member 24. The arcuate plate 25 occupies the position shown in solid lines in FIG. 4, and retains the coins in the recess and facilitates the stacking thereof. The energizing circuit of the electromagnet 48 is then energized, which produces an axial movement of the clutch member 4 in FIG. 1 toward the right, causing engagement of the teeth on the clutch member 4 with those on the bevel gear 5a and producing a rotation of the bevel gear 7, shaft 15, drum 1 and cam 12 in a counterclockwise direction as indicated by the arrow in FIG. 6. At the initiation of this rotation, the movable contact 13 is forced out of the recess 12a, closing a holding circuit to continue the energization of the solenoid 48 and the continued operation of the drum 1. The rotation of the disk 18 causes the pin 27 to engage the notch 20b in the stop member 20, causing rotation of the latter in a clockwise direction, until the nose of the latch 21 drops into the notch 23′, which moves and retains the stop member 20 in its operative position (FIG. 5) and moves and retains the stop member 24 in its inoperative position. As the drum 1 rotates, the stack 35 of coins at the feeding station A is carried in a counterclockwise direction, forcing the resiliently mounted arcuate plate 25 to the position shown at 25′ in dotted lines (FIG. 4), the coins resting on the arcuate supporting member 23a, and the rims of the coins contacting the arcuate plate 19a, to prevent the coins from falling from the recess 26a. This rotation continues for approximately 120° or until the stack 35 reaches the wrapping station B, as shown in FIG. 5, at which time the movable contact 13 drops into the recess 12b in the cam 12 to break the holding circuit, which deenergizes the solenoid 48, whereupon the spring 50 rotates the lever 49 in a clockwise direction (FIG. 2). Prior to this last operation, a pawl lever, not shown, operable by the cam 14 on the shaft 15, was removed from a blocking position relative to the lever 49, so that the spring 50 becomes effective to swing the lever 49 and the clutch member 4 operated thereby past the neutral position shown in FIG. 1 to its left hand position, wherein the teeth on the left hand side of the clutch member 4 engage the teeth on the bevel gear 5, causing rotation of the bevel gears 5 and 8, shaft 9, and the rollers 43 driven from the shaft 9. A stop member, not shown, retains the cylinder 3 in spaced relation with the stack 35 of coins. As the block 34b is permitted to move upward to its operative position by the cam 10, the block releases said stop member, thereby permitting the cylinder 3 to swing toward the periphery of the drum 1. This operation brings the winding cylinder 3 (which is continually in rotation) against the stack 35 of coins and the strip of wrapping material 36 interposed between the roller and the stack of coins. The rotary motion of the roller 3 in a clockwise direction, as shown by the arrow in FIG. 8, coils the wrapping material 36 around the stack 35 of coins, the rotation of the stack being facilitated by the rollers 26 in the recesses 26a. During this operation, the cams 10 and 10a permit the beading hooks 34c and 34 to approach each other under the action of the connecting spring 34d, which engages the edges of the wrapping material 36 and form beads thereon. A single revolution of the shaft 9 and the cams thereon is effective to bring the beading hooks 34 and 34a into their operative position and to remove them to a position remote from the wrapping material. As the block 34b is returned to its inoperative position by the cam 10, the cylinder 3 is swung away from the periphery of drum 1 to be engaged by the stop member (not shown).

At the same time the rollers 43, driven by the shaft 9, feed the wrapping material 36, and the movable cutting blade 42, under the action of the cam 11 and lever 39, cuts a predetermined length of wrapping material. The predetermined length of wrapping material is maintained in proper position by the feeding member 52 (FIG. 2), preparatory for the next winding step.

At this time, a cam, not shown, fastened to the shaft 9, operates a microswitch to again close the circuit of the solenoid 48, which disengages the clutch member 4 from the bevel gear 5 into engagement with the bevel gear 5a, producing a second rotational step of the drum 1. At the initial movement of the drum 1, the movable contact 13 is forced out of the recess 12b, forming a holding circuit as the contact 13 rides the peripheral portion of the cam 12 for approximately 240° to the position shown in FIG. 6, where the circuit is broken when the contact enters the recess 12a. As soon as the drum 1 starts to rotate, the wrapped stack 35 of coins rides past the end of the track 23a, and drops into a receiving device.

During the above second rotation step of the drum 1, the cam 14 lowers the pawl lever (not shown) into a blocking position relative to the lever 49, so that, as soon as the solenoid 48 is deenergized by the circuit under control of the cam 12, the clockwise movement of the lever 49 under the action of spring 50 is blocked by the pawl lever with the clutch member 4 in its neutral position shown in FIG. 1.

A predetermined number of coins can be fed into the tube 2 as soon as the recess 26a leaves the feeding station A and the stop member 20 is restored to its operative position as described above. As soon as the recess 26a reaches the feeding station (FIG. 6), a new cycle can be initiated, which is completely automatic, and stops when the drum completes one full revolution and the recess 26a is again at the feeding station A.

We claim:

1. A stacking and wrapping apparatus for coins and the like, comprising: means defining a coin feeding station; and a coin wrapping station; indexing means comprising a conveyor receiving coins at the feeding station and transferring the coins to the wrapping station; means, at the feeding station and comprising an upright stacking tube having a laterally movable bottom closure for intermittently feeding a predetermined number of coins to said conveyor; means, at the wrapping station, intermittently wrapping said coins; and means intermittently moving the conveyor to transfer the coins from the feeding station to the wrapping station, said conveyor comprising a rotary drum having at least one axially extending recess in its periphery in axial alignment with and below said stacking tube when at said feeding station, to receive the coins from said stacking tube when said bottom closure is opened.

2. A stacking and wrapping apparatus for coins and the like, comprising: a coin feeding station; a coin wrapping station; indexing means, comprising a conveyor receiving coins at the feeding station and transferring the coins to the wrapping station; means, at the feeding station, intermittently feeding a predetermined number of coins to said conveyor; means, at the wrapping station for intermittently wrapping said coins; and means intermittently moving the conveyor to transfer the coins from the feeding station to the wrapping station, said conveyor comprising a rotary drum having at least one axially extending recess in its periphery to receive and stack the coins, and in which the coin feeding means comprises a tube axially aligned with said recess when at the feeding station, said tube being positioned above said recess, and a movable stop means between the bottom of the tube and the recess, said stop means comprising a pivoted member movable between a tube opening and a tube closing position, means rotatable with the drum and engageable with said pivoted member for moving said member to its tube closing position, releasable means connected to said pivoted member to retain the latter in its tube closing position, and resilient means connected to said pivoted member urging said member to its tube opening position.

3. A stacking and wrapping apparatus as defined in claim 2, in which the pivoted member retaining means comprises a latch, and electrically actuated means connected to said latch for tripping the same.

4. A stacking and wrapping apparatus as defined in claim 1, in which the conveyor comprises a rotary drum having at least one axially extending recess in its periphery to receive and stack the coins, and in which the coin feeding means comprises a tube axially aligned with said recess when at the feeding station, said tube being positioned above said recess, and a movable stop means between the bottom of the tube and the recess, said stop means comprising a pivoted member movable between a tube opening and a tube closing position, means rotatable with the drum and engageable with said pivoted member for moving said member to its tube closing position, releasable means connected to said pivoted member to retain the latter in its tube closing position, and resilient means connected to said pivoted member urging said member to its tube opening position, said conveyor comprising a rotary drum having a series of axially extending recesses of different diameters in its periphery to receive and stack coins of different diameters, a coin feeding tube at the coin feeding station, said drum being rotatable to move the recesses below the tube to permit transfer of coins from the tube into the recesses, and adjustable means to render one recess operative to receive coins and the other recesses inoperative, a rotatable shaft, said drum being rotatably mounted on said shaft, said adjustable means comprising a disk connected to said shaft for rotation therewith, said disk overlying said drum and having a diameter substantially the same as the diameter of the drum, said disk having a peripheral recess, and means connecting said drum for rotation with said disk with the recess in the drum in registry with a selected recess in the drum.

5. A stacking and wrapping apparatus for coins and the like, comprising: a coin feeding station; a coin wrapping station; indexing means, comprising a conveyor receiving coins at the feeding station and transferring the coins to the wrapping station; means, at the feeding station, intermittently feeding a predetermined number of coins to said conveyor; means, at the wrapping station, intermittently wrapping said coins; and means intermittently moving the conveyor to transfer the coins from the feeding station to the wrapping station, in which the conveyor comprises a rotary drum having at least one axially extending recess in its periphery to receive and stack the coins, and in which the coin feeding means comprises a tube axially aligned with said recess when at the feeding station, including means coaxially of said tube and cooperable with said recess to form a tubular coin receiving pocket, and yieldable mounting means for said pocket forming means whereby movement of a coin containing recess from the feeding station moves said pocket forming means to one side.

6. A stacking and wrapping apparatus as defined in claim 1, including a stack supporting means below the drum and registrable with the recess therein to support a stack of coins delivered from the feeding station to the wrapping station.

7. A stacking and wrapping apparatus as defined in claim 1, including a power transmission to operate the conveyor moving means and the wrapping means, said transmission comprising a continuously rotated power shaft, separate driven means connected to said conveyor means and wrapping means, and clutch means for intermittently and selectively connecting the power shaft to either of said driven means.

8. A stacking and wrapping apparatus as defined in claim 7, in which the clutch means comprises a driving clutching element rotatable with the shaft and slidable axially thereof, and a pair of spaced driven clutching elements rotatably mounted on said shaft, one on each end of said driving clutching element, one of said driven clutching elements being connected to the conveyor moving means and the other of said driven clutching elements being connected to said wrapping means, and means connected to the driving clutching element axially sliding the same to selectively engage one of the driven clutching elements.

9. A stacking and wrapping apparatus for coins and the like, comprising: a coin feeding station; a coin wrapping station; indexing means, comprising a conveyor receiving coins at the feeding station and transferring the coins to the wrapping station; means, at the feeding station, intermittently feeding a predetermined number of coins to said conveyor; means, at the wrapping station intermittently wrapping said coins; and means intermittently moving the conveyor to transfer the coins from the feeding station to the wrapping station, a beading means at the wrapping station, and means, synchronized with the operation of the wrapping means, to render the beading means operative to concurrently provide a bead on each end of the wrapped stack of coins, said beading means comprising a pair of spaced beading hooks, a pair of blocks, one supporting each hook, guide means providing aligned slots which slidingly support said blocks for movement between operative and inoperative positions, resilient means connected to said blocks urging the hooks into an operative position, and cam means, cooperable with said blocks, moving said blocks to an inoperative position.

10. A stacking and wrapping apparatus for coins and the like, comprising: a coin feeding station; a coin wrapping station; indexing means, comprising a conveyor receiving coins at the feeding station and transferring the coins to the wrapping station; means, at the feeding station, intermittently feeding a predetermined number of coins to said conveyor; means, at the wrapping station intermittently wrapping said coins; and means intermittently moving the conveyor to transfer the coins from the feeding station to the wrapping station, a beading means at the wrapping station, and means, synchronized with the operation of the wrapping means, to render the beading means operative to concurrently provide a bead on each end of the wrapped stack of coins, said bending means comprising a pair of spaced beading hooks, a pair of blocks, one supporting each hook, guide means providing aligned slots which slidingly support said blocks for movement between operative and inoperative positions, resilient means connected to said blocks urging the blocks toward one another to an operative position, cam means, cooperable with said blocks, moving said blocks apart to an inoperative position, a rotating shaft carrying said cams, and means mounting one of said cams for axial adjustment on said shaft.

References Cited in the file of this patent

UNITED STATES PATENTS

| | | |
|---|---|---|
| 1,116,560 | Buhse | Nov. 10, 1914 |
| 1,875,567 | Daniels | Sept. 6, 1932 |
| 2,709,880 | Jorgensen | June 7, 1955 |
| 2,855,739 | Schoenewolf | Oct. 14, 1958 |